May 31, 1949.  R. E. SEELY  2,471,840
ELECTRIC PROTECTIVE MEANS
Filed Sept. 13, 1945
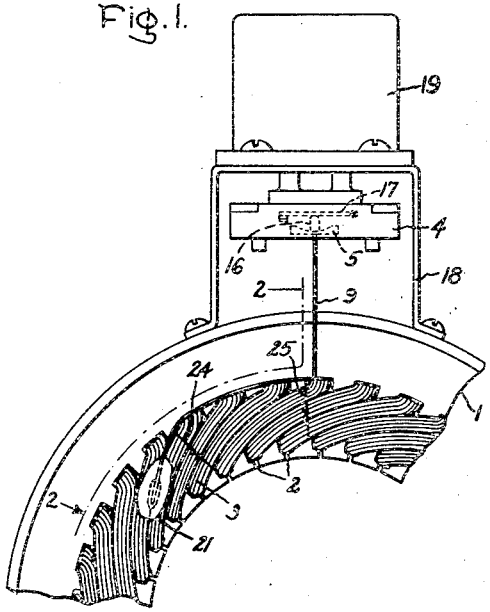
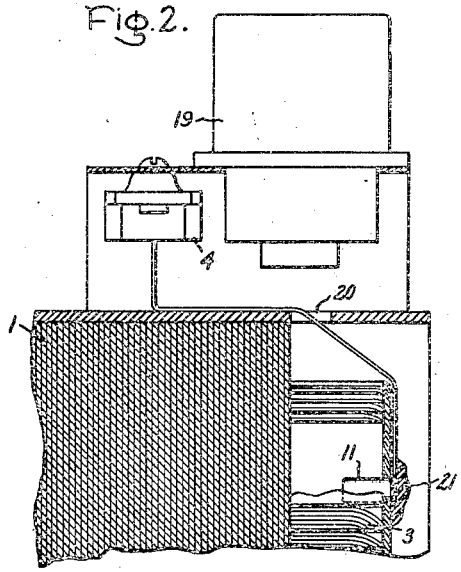
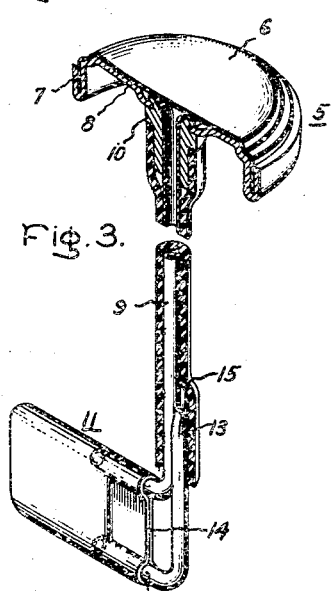
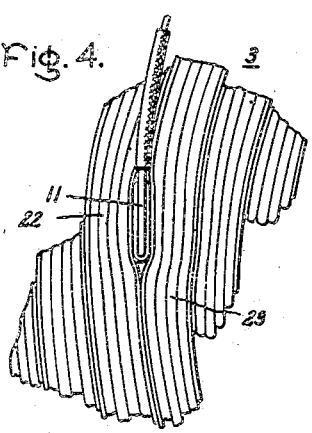
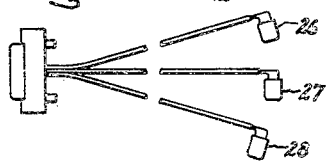
Inventor:
Richard E. Seely,
by his Attorney.

Patented May 31, 1949

2,471,840

UNITED STATES PATENT OFFICE 2,471,840

ELECTRIC PROTECTIVE MEANS

Richard E. Seely, Fort Wayne, Ind., assignor to General Electric Company, a corporation of New York Application September 13, 1945, Serial No. 615,993

3 Claims. (Cl. 171—252)

My invention relates to electric protective means, more particularly to means for protecting devices, such as electric motors and the like, against abnormal high temperatures caused by excessive current in the motor windings and has for its object a simple, reliable and inexpensive protective means having quick response to temperature changes in the motor windings.

My invention is especially useful in the protection of small alternating current electric motors of fractional horse-power size, such as used in the driving of household refrigerators, stokers, washing machines and the like.

It is a further object of my invention to provide a protective device which is in close thermal relation with the end turns of the motor stator winding thereby to respond quickly to excessive currents, particularly during locked rotor conditions of the motor. Under these conditions when the motor is energized the rotor of the motor is unable to start because of unusual conditions in the apparatus driven by the motor, such as sticking or jamming of the parts of the apparatus. I have found that under such locked rotor conditions the projecting end turns of the stator winding are heated more quickly by the excessive currents than the portions of the winding in the stator slots. This is because the winding portions in the slots are cooled by the conduction of heat to the magnetic iron of the stator, whereas no effective cooling of the projecting end turns of the windings occurs by reason of the fact that no substantial circulation or agitation of the entrapped air in the motor housing occurs when the motor rotor is not turning.

In accordance with my invention, I provide a temperature responsive vapor pressure operated device having a small tube with a bulb of minimum thermal capacity on one end which bulb is inserted between the projecting end turns of the motor. This bulb is further embedded in the end turns by a special cement having good thermal conductivity and providing an intimate conductive thermal relation between the bulb and the windings.

For a more complete understanding of my invention, reference should be had to the accompanying drawing, Fig. 1 of which is a fragmentary end view of an electric motor stator provided with protective means embodying my invention. Fig. 2 is a fragmentary side view, partly in section, along the line 2—2 of Fig. 1 looking in the direction of the arrows; Fig. 3 is an enlarged view in perspective of temperature responsive means embodying my invention; Fig. 4 is an enlarged fragmentary end view showing the bulb inserted between the end turns of different phases; while Fig. 5 is a side elevation view showing a modified form of my invention.

Referring to the drawing, I have shown my invention in one form as applied to a typical electric motor provided with a magnetic iron stator 1, having a plurality of slots 2, in which is mounted a polyphase stator winding 3. It will be understood that the winding 3 consists of a plurality of turns or coils wound from electrically insulated electrically conducting wire with the end turns projecting from each end of the stator 1. Associated with the stator 1 is a rotor (not shown) which may be provided with a conventional squirrel cage winding.

In carrying out my invention in one form, I utilize a vapor pressure operated switching device such as described in U. S. Patent 2,369,986, issued on February 20, 1945, to Edward J. Schaefer for Electric protective means. This switching device comprises an enclosure member 4 made of a suitable molded electrically insulating material in which is mounted a container 5 in the shape of a disk or plate. The upper fluid pressure responsive disk-shaped wall 6 of the container is formed with a normally concave upper surface, as shown in Fig 3, and constitutes a snap action diaphragm. As shown, the diaphragm 6 has a peripheral flange 7 over which is crimped a peripheral flange on the bottom wall 8 of the container 5.

A steel tube 9 has one end connected to the center of the bottom wall 8. This connection is formed by means of an intermediate member 10 whose upper end extends through a central aperture in the wall 8 and which is provided in turn with an aperture into which extends the upper end of the tube 9. The upper end of the member 10 and the tube are peened over to secure them respectively to the bottom wall 8 and the auxiliary member 10, and these parts are further secured together by brazing or silver soldering to form fluid-tight joints.

The other end of the tube 9 is connected to a small, thin bulb 11 of rectangular shape and having a substantially rectangular cross section. The bulb 11 consists of a steel container of substantially flattened tubular form as shown in Fig. 3 with one end closed and with paralell flat sides giving a maximum area for the conduction of heat to the liquid in the bulb. In its opposite end is secured the lower end of the tube 9 and a short tube 12 having a closed end 13. To facilitate mounting in the end turns of the motor, the bulb 11 is secured to the lower end of the tube 9 so as to extend at right angles with the tube, the lower end of the tube having a transversely extending portion, as shown, extending into the bulb, as does also the tube 12. Preferably, as shown, the transverse portions of the tubes extending into the bulb are positioned at opposite edges of the bulb with the sides of the bulb between the portions pressed together, as indicated by the numeral 14. The sides 14 are secured together and the wall of the bulb is secured to the transverse portions of the tubes 9 and 12 by brazing, or, preferably, by silver solder, so that the bulb, the tube 9, and the container 5 form together a sealed chamber which is almost entirely filled with a stable liquid. In order to minimize the effect of liquid expansion, the container, tube and bulb are made as small as possible. The bulb is made just large enough to hold sufficient liquid to operate the diaphragm 6. The purpose of the tube 12 is to provide a final seal for the chamber after it has been substantially filled with the liquid. The end 13 is then compressed and sealed by silver soldering or resistance welding and the tube 12 bent back against the tube 9, as shown. Preferably, as shown, the tube 9 and the upper end of the tube 13 are covered with a layer 15 of electrically insulating material, such as a fabric material impregnated with a varnish.

In the operation of the device the bulb 11 is positioned with its parallel flat sides in intimate thermal relation with the end turns 3 of the motor winding. When the bulb is heated to a predetermined temperature dependent upon the boiling temperature of the liquid and the force required to snap the diaphragm, the hydrostatic pressure in the sealed chamber arising from the vapor pressure of the liquid in the bulb and transmitted by the liquid in the tube is sufficient to snap the diaphragm 6 upward to its inverted or convex position whereby a pin 16, made of electrically insulating material, is moved upward by the diaphragm and moves a spring switch arm 17 to its open circuit position. Preferably the switch formed by the switch arm 17 and its cooperating switch contact is connected in the circuit of the motor so that when the switch is opened the motor is deenergized. I have found that suitable vaporizable liquids are cumene, pseudo-cumene, xylene, toluene and the alcohols ranging from methanol to octanol. The choice of liquid depends upon the particular operating temperature desired.

Preferably, as shown in the drawing, I mount the enclosure 4 in a suitably convenient position on the exterior of the motor, the enclosure 4 being secured to a bracket 18 mounted on the exterior of the motor stator 1. Also mounted on bracket 18 is a suitable plug connector 19 by means of which the motor may be connected electrically to a suitable supply circuit. It will be understood that electrical connections (not shown) are provided between the connector 19, the switch in the enclosure 4, and the electric motor.

From the enclosure 4 the electrically insulated tube 9 extends through an aperture 20 in the motor shell and downward along the end turns so as to bring the bulb to a suitable position where it is embedded in the end turns, preferably between the end turns of two coils in different phases of the motor in the event that the motor is a poly-phase motor. On a single phase motor the bulb is inserted in the starting winding end turns and near the main or running winding end turns to provide protection under both locked rotor and running conditions. I make the tube 9 of a metal having a low heat conductivity, such as steel, and small in size to minimize the loss of heat from the bulb by conduction through the tube. Also, the tube is flexible so that the enclosure 4 with the diaphragm and switch can be mounted where space is available. The thermal capacity of the bulb, also made of steel, is made as small as possible by reducing the size of the bulb. This construction minimizes the temperature lag of the bulb and makes the device quickly responsive to temperature changes in the winding. In a typical device the tube 9 had an outside diameter of .04" while the bulb, having .01" thick steel walls, had a corresponding dimension between its parallel sides to receive the ends of the two tubes and was .4" long and .21" wide.

Preferably, the bulb 11 is inserted between the end turns of the winding by first inserting a flat plug between the end turns thereby to form a space for the bulb, after which the plug is removed and the bulb is inserted in the space, or hole, left by the plug, with the opposite flat sides of the bulb parallel with the turns and between and in engagement with them to give a maximum area for the conduction of heat to the bulb. Also, for the purpose of increasing the heat conducting relation between the bulb and the turns of the winding, I embed the bulb in a special cement having good heat conductivity. The cement is applied in thin plastic form, the hole made by the plug being first filled with the cement after which the bulb is inserted, whereby the excess cement is forced out of the hole.

This excess cement with an additional quantity, if desired, is positioned to embed the outer end of the bulb as indicated in Fig. 2 by the reference numeral 21. Preferably, the cement consists of a mixture of 35% by weight of Bakelite solventless varnish and 65% by weight of silica powder. To this mixture is added a catalyst consisting of tertiarybutyl hydroperoxide in the proportion of ½₀ milligram of the catalyst to 7 grams of the cement.

After the bulb is applied to the winding, the motor stator with the bulb attached is placed in an oven maintained at a temperature of approximately 125 degrees C. and heated in the oven for about four hours, whereby the cement is hardened. The hardened cement has good thermal conductivity by reason of the good thermal conductivity of the silica powder and also by reason of the fact that the solventless varnish used in the cement hardens as a solid mass without voids caused by bubbles. It will be observed that the bulb 11 is embedded in this hardened cement in and between the end turns of the motor winding in intimate thermal relation therewith so that the temperature of the bulb is quickly responsive to any change in the temperature of the end turns. Therefore, the vapor pressure in the sealed chamber formed by the tube 9, the container 5, and the bulb 11, is also quickly responsive to changes in the bulb temperature for operation of the switch arm 17 to its open circuit position.

This quick response to temperature changes is of particular importance under locked rotor conditions when both the stator and the rotor windings are heated very quickly to excessive temperatures. I have found that the bulb 11 mounted in the end turns of the winding gives this quick response so that the motor circuit is opened under locked rotor conditions before the windings are heated to damaging temperatures. Under locked rotor conditions it will be understood that the projecting end turns constitute the hottest part of the winding since the portions of the winding embedded in the slots of the stator are cooled by conduction to the stator.

My protective means also gives adequate protection to the motor against all running overloads, in which case a considerable interval of time is required for the motor winding to heat to an excessive temperature. Under such conditions, the end turns of the winding do not increase in temperature as fast as the winding portions in the stator slots for the reason that the end turns are cooled more adequately by the circulation of the air entrapped in the motor housing. While the bulb 11 may not be in contact under overload conditions with the hottest portion of the winding, the temperature of the end turns is sufficient to snap the diaphragm and open the motor circuit before any hotter interior portions reach an excessive temperature.

When the stator winding 3 is a polyphase winding, I preferably insert the bulb between coils of the winding in different phases. As shown more clearly in Fig. 4, the bulb 11 is mounted between the coils 22 and 23 in different phases of the three-phase winding 3. This has the advantage that the bulb is still responsive to the temperature of the remaining winding even though an open circuit should occur in one of the windings 22 or 23. As shown in Fig. 1, the insulated tube 9 is bound in position on the end turns by cords 24 and 25.

In Fig. 5 I have shown a modified form of temperature responsive device provided with three bulbs 26, 27 and 28, each in the end of a separate tube. The opposite ends of the three tubes are connected to a container (not shown) similar to the container 5 so that all three tubes communicate with the interior of the container and form part of a sealed chamber for the vaporizable liquid. The heating of any one of the three bulbs causes operation of the diaphragm 6 even though the other two bulbs remain cold. This three bulb device may be used to give complete overload protection for a four wire, three phase motor, for example, when either one or two line leads become disconnected. In such an application the bulbs may either be placed in the end turns of the windings of the three phases or in adjacent resistance heaters connected in three of the line leads, whereby each bulb is heated in accordance with the current in its line lead. Also, a two bulb device may be used to protect two speed motors having two separate windings, one bulb being inserted in the end turns of each winding.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim and desire to secure by Letters Patent of the United States is:

1. The combination with an electric device having a stator provided with slots, a winding of electrically insulated wire in said slots having end turns projecting from said slots, a tube of a material having low heat conductivity, a bulb provided with substantially paralled flat sides on one end of said tube inserted between said end turns with said flat sides in engagement with said end turns, a container having a fluid pressure responsive wall, a connection between said container and the other end of said tube whereby said tube, bulb and container form a sealed chamber, a liquid in said chamber adapted to be vaporized in said bulb in response to a predetermined temperature in said end turns for operation of said wall, said chamber and the contained liquid having a small volume and thermal capacity thereby to minimize the effect of thermal expansion of said liquid and to obtain optimum speed of response of said pressure responsive wall, and switching means connected to control the circuit of said device operated by said wall to deenergize said device when said end turns reach a predetermined high temperature.

2. The combination with an electric device having a stator provided with slots, a winding of electrically insulated wire in said slots having end turns projecting from said slots, a tube of a material having low heat conductivity, a bulb on one end of said tube inserted between said end turns, a hardened heat conductive cement embedding said bulb in said end turns in intimate thermal relation therewith, a container having a fluid pressure responsive wall, a connection between said container and the other end of said tube whereby said tube, bulb and container form a sealed chamber, a liquid in said chamber adapted to be vaporized in said bulb in response to a predetermined temperature in said end turns for operation of said wall, said chamber and the contained liquid having a small volume and thermal capacity thereby to minimize the effect of thermal expansion of said liquid and to obtain optimum speed of response of said pressure responsive wall, and switching means connected to control the circuit of said device operated by said wall to deenergize said device when said end turns reach a predetermined high temperature.

3. The combination with an electric device having a stator provided with slots, a winding of electrically insulated wire in said slots having end turns projecting from said slots, a tube of a material having low heat conductivity, a flat bulb on one end of said tube inserted between said end turns, a hardened heat conductive cement containing a substantial portion of silica powder embedding said bulb in said end turns in good thermal relation therewith, an enclosure member mounted on said stator, a container in said enclosure having a fluid pressure responsive diaphragm, a connection between said container and the other end of said tube whereby said bulb, tube and container form a sealed chamber, a stable liquid in said chamber nearly filling said chamber, said chamber being small to minimize the quantity of said liquid and thereby to minimize the effect of thermal expansion of said liquid, and said bulb being just large enough to contain sufficient liquid to effect operation of said diaphragm by hydro-static pressure in said chamber produced by vaporization of said liquid in said bulb, and switching means connected to control the circuit of said device operated by said diaphragm to deenergize said device when said end turns reach a predetermined high temperature.

RICHARD E. SEELY.

REFERENCES CITED

The following references are of record in the file of this patent:

UNITED STATES PATENTS

| Number | Name | Date |
| --- | --- | --- |
| 1,782,458 | Brennen | Nov. 25, 1930 |
| 1,795,149 | Shivers | Mar. 3, 1931 |
| 1,947,078 | Cobb | Feb. 13, 1934 |
| 2,121,079 | Eskin | June 21, 1938 |
| 2,260,014 | Ettinger | Oct. 21, 1941 |
| 2,328,406 | Atchison | Aug. 31, 1943 |
| 2,369,986 | Schaefer | Feb. 20, 1945 |
| 2,374,055 | Treanor | Apr. 17, 1945 |